United States Patent
vanZelst et al.

(10) Patent No.: US 8,457,232 B2
(45) Date of Patent: *Jun. 4, 2013

(54) DETECTING THE NUMBER OF TRANSMIT ANTENNAS IN WIRELESS COMMUNICATION SYSTEMS

(75) Inventors: Albert vanZelst, Woerden (NL); Vincent K. Jones, Redwood City, CA (US); D. J. Richard vanNee, DeMeen (NL)

(73) Assignee: QUALCOMM Incorporated, San Diego, CA (US)

(*) Notice: Subject to any disclaimer, the term of this patent is extended or adjusted under 35 U.S.C. 154(b) by 693 days.

This patent is subject to a terminal disclaimer.

(21) Appl. No.: 12/469,323

(22) Filed: May 20, 2009

(65) Prior Publication Data

US 2009/0238299 A1 Sep. 24, 2009

Related U.S. Application Data

(63) Continuation of application No. 11/139,925, filed on May 27, 2005, now Pat. No. 7,539,260.

(60) Provisional application No. 60/575,608, filed on May 27, 2004.

(51) Int. Cl.
*H04B 7/02* (2006.01)
*H04L 27/00* (2006.01)

(52) U.S. Cl.
USPC ........... 375/267; 375/299; 375/260; 375/259; 375/295

(58) Field of Classification Search
USPC ..................... 375/267, 299, 260, 259, 295
See application file for complete search history.

(56) References Cited

U.S. PATENT DOCUMENTS

| 5,131,006 A | 7/1992 | Kamerman et al. |
| 5,553,064 A | 9/1996 | Paff et al. |

(Continued)

FOREIGN PATENT DOCUMENTS

| EP | 0646992 A1 | 4/1995 |
| EP | 648032 A1 | 4/1995 |

(Continued)

OTHER PUBLICATIONS

Office Action in U.S. Appl. No. 11/139,925 dated Sep. 3, 2008, 28 pages.

(Continued)

*Primary Examiner* — Daniel Washburn
*Assistant Examiner* — Brian J Stevens
(74) *Attorney, Agent, or Firm* — Kenyon S. Jenckes

(57) ABSTRACT

To detect the number of transmit antennas, a fast Fourier transform operation is performed on the received samples of the transmitted long training symbols of a preamble. Next, each of the Fourier transformed results is multiplied with the reference frequency-domain representation of the long training symbol so as to remove the effect of the symbols and to maintain the channel information. Next, inverse Fourier transform or least squares operations is performed on the multiplied values to compute channel impulse response. The number of shifted impulse response in the channel impulse response represents the detected number of transmit antennas. Packets containing preambles of the present invention may be received by extended devices as well as by legacy receivers that are not configured to receive and interpret these preambles. The training symbols may be cyclically-shifted and transmitted on different transmit antennas.

23 Claims, 5 Drawing Sheets

U.S. PATENT DOCUMENTS

| | | | |
|---|---|---|---|
| 5,694,421 | A | 12/1997 | Park |
| 6,055,231 | A | 4/2000 | Mesecher et al. |
| 6,118,806 | A | 9/2000 | Niida et al. |
| 6,144,711 | A | 11/2000 | Raleigh et al. |
| 6,226,508 | B1 | 5/2001 | Takahashi et al. |
| 6,260,167 | B1 | 7/2001 | Lo et al. |
| 6,304,750 | B1 | 10/2001 | Rashid-Farrokhi et al. |
| 6,452,981 | B1* | 9/2002 | Raleigh et al. ............... 375/299 |
| 6,473,467 | B1 | 10/2002 | Wallace et al. |
| 6,563,460 | B2 | 5/2003 | Stilp et al. |
| 6,661,857 | B1 | 12/2003 | Webster et al. |
| 6,670,310 | B2 | 12/2003 | Wojtecki |
| 6,678,310 | B1 | 1/2004 | Andren et al. |
| 6,690,715 | B2 | 2/2004 | Webster et al. |
| 6,757,322 | B2 | 6/2004 | Schilling |
| 6,934,323 | B2 | 8/2005 | Hara |
| 7,006,040 | B2 | 2/2006 | Henderson et al. |
| 7,082,159 | B2 | 7/2006 | Larsson |
| 7,088,782 | B2 | 8/2006 | Mody et al. |
| 7,106,709 | B2 | 9/2006 | Davidsson et al. |
| 7,106,784 | B2 | 9/2006 | Eltawil et al. |
| 7,123,662 | B2 | 10/2006 | Li et al. |
| 7,161,996 | B1 | 1/2007 | Steele et al. |
| 7,177,369 | B2 | 2/2007 | Crilly, Jr. |
| 7,184,495 | B2 | 2/2007 | Thomson et al. |
| 7,190,748 | B2 | 3/2007 | Kim et al. |
| 7,203,245 | B1 | 4/2007 | Murphy |
| 7,269,127 | B2 | 9/2007 | Mody et al. |
| 7,269,224 | B2 | 9/2007 | Stuber et al. |
| 7,282,617 | B2 | 10/2007 | Schinski et al. |
| 7,286,617 | B2 | 10/2007 | Vanderperren et al. |
| 7,327,717 | B2 | 2/2008 | Borowski et al. |
| 7,352,688 | B1 | 4/2008 | Perahia et al. |
| 7,400,643 | B2 | 7/2008 | Hansen et al. |
| 7,423,989 | B2 | 9/2008 | Hansen et al. |
| 7,453,793 | B1 | 11/2008 | Jones, IV et al. |
| 7,466,667 | B2 | 12/2008 | Jones, IV et al. |
| 7,539,260 | B2 | 5/2009 | Van Zelst et al. |
| 7,561,646 | B2 | 7/2009 | Steele et al. |
| 7,583,746 | B2 | 9/2009 | Aoki et al. |
| 7,586,884 | B2 | 9/2009 | Awater et al. |
| 7,599,332 | B2 | 10/2009 | Zelst et al. |
| 7,599,333 | B2 | 10/2009 | Jones et al. |
| 7,647,069 | B2 | 1/2010 | Zhang |
| 7,856,068 | B1 | 12/2010 | Tung et al. |
| 7,945,007 | B2 | 5/2011 | Steele et al. |
| 8,000,223 | B2 | 8/2011 | Moorti et al. |
| 8,023,397 | B2 | 9/2011 | Awater et al. |
| 8,218,427 | B2 | 7/2012 | Lee et al. |
| 2001/0033603 | A1 | 10/2001 | Olaker |
| 2002/0012411 | A1 | 1/2002 | Heinzl et al. |
| 2002/0065047 | A1 | 5/2002 | Moose |
| 2002/0101825 | A1* | 8/2002 | Beck et al. ............... 370/252 |
| 2002/0105375 | A1 | 8/2002 | Sorokine |
| 2002/0111142 | A1 | 8/2002 | Klimovitch |
| 2002/0114269 | A1 | 8/2002 | Onggosanusi et al. |
| 2002/0118635 | A1 | 8/2002 | Nee |
| 2002/0122511 | A1 | 9/2002 | Kwentus et al. |
| 2002/0160737 | A1 | 10/2002 | Crawford |
| 2002/0163933 | A1 | 11/2002 | Benveniste |
| 2003/0012160 | A1 | 1/2003 | Webster et al. |
| 2003/0072255 | A1 | 4/2003 | Ma et al. |
| 2003/0153275 | A1* | 8/2003 | Oh et al. ............... 455/67.6 |
| 2003/0210646 | A1 | 11/2003 | Ohseki et al. |
| 2003/0235255 | A1 | 12/2003 | Ketchum et al. |
| 2003/0236108 | A1 | 12/2003 | Li et al. |
| 2004/0001430 | A1 | 1/2004 | Gardner |
| 2004/0005018 | A1 | 1/2004 | Zhu et al. |
| 2004/0005022 | A1 | 1/2004 | Zhu et al. |
| 2004/0030530 | A1 | 2/2004 | Li et al. |
| 2004/0032825 | A1 | 2/2004 | Halford et al. |
| 2004/0048574 | A1 | 3/2004 | Walker et al. |
| 2004/0052231 | A1 | 3/2004 | Ramaswamy et al. |
| 2004/0071104 | A1 | 4/2004 | Boesel et al. |
| 2004/0100939 | A1 | 5/2004 | Kriedte et al. |
| 2004/0105512 | A1 | 6/2004 | Priotti |
| 2004/0114546 | A1 | 6/2004 | Seshadri et al. |
| 2004/0116112 | A1 | 6/2004 | Gray |
| 2004/0120428 | A1 | 6/2004 | Maltsev et al. |
| 2004/0161046 | A1 | 8/2004 | Schott et al. |
| 2004/0190560 | A1 | 9/2004 | Maltsev et al. |
| 2004/0198265 | A1 | 10/2004 | Wallace et al. |
| 2004/0203383 | A1 | 10/2004 | Kelton et al. |
| 2004/0204026 | A1 | 10/2004 | Steer et al. |
| 2004/0240402 | A1 | 12/2004 | Stephens |
| 2004/0242273 | A1 | 12/2004 | Corbett et al. |
| 2004/0258025 | A1 | 12/2004 | Li et al. |
| 2004/0266375 | A1 | 12/2004 | Li et al. |
| 2005/0002327 | A1 | 1/2005 | Li |
| 2005/0018754 | A1 | 1/2005 | Song |
| 2005/0030886 | A1* | 2/2005 | Wu et al. ............... 370/206 |
| 2005/0047384 | A1 | 3/2005 | Wax et al. |
| 2005/0105460 | A1 | 5/2005 | Suh et al. |
| 2005/0152314 | A1 | 7/2005 | Sun et al. |
| 2005/0157801 | A1 | 7/2005 | Gore et al. |
| 2005/0180353 | A1 | 8/2005 | Hansen et al. |
| 2005/0233709 | A1* | 10/2005 | Gardner et al. ............... 455/101 |
| 2005/0237992 | A1 | 10/2005 | Mishra et al. |
| 2005/0281241 | A1 | 12/2005 | Webster et al. |
| 2006/0013180 | A1 | 1/2006 | Gupta et al. |
| 2006/0013327 | A1 | 1/2006 | Sugar et al. |
| 2006/0034389 | A1 | 2/2006 | Aoki |
| 2006/0088120 | A1 | 4/2006 | Hansen et al. |
| 2006/0258303 | A1 | 11/2006 | Taira et al. |
| 2006/0270364 | A1 | 11/2006 | Aoki |
| 2006/0281487 | A1 | 12/2006 | Girardeau et al. |
| 2007/0117523 | A1 | 5/2007 | Weber et al. |
| 2009/0238299 | A1* | 9/2009 | van Zelst et al. ............... 375/267 |
| 2010/0061402 | A1 | 3/2010 | Van Zelst et al. |
| 2011/0317775 | A1 | 12/2011 | Gardner et al. |

FOREIGN PATENT DOCUMENTS

| | | |
|---|---|---|
| EP | 0657968 A1 | 6/1995 |
| JP | 63033028 A | 2/1988 |
| JP | 07211392 | 8/1995 |
| JP | 11145896 A | 5/1999 |
| JP | 2001292128 A | 10/2001 |
| JP | 2003008676 | 1/2003 |
| JP | 2003018119 A | 1/2003 |
| JP | 2003503889 A | 1/2003 |
| JP | 2003069546 | 3/2003 |
| JP | 2003115812 | 4/2003 |
| JP | 2003143106 | 5/2003 |
| JP | 2003163669 A | 6/2003 |
| JP | 2003169008 A | 6/2003 |
| JP | 2003319005 A | 11/2003 |
| JP | 2003348048 | 12/2003 |
| JP | 2004503130 T | 1/2004 |
| JP | 2004153529 A | 5/2004 |
| JP | 2004214726 A | 7/2004 |
| JP | 2004289373 A | 10/2004 |
| JP | 2004297172 | 10/2004 |
| JP | 2004328267 A | 11/2004 |
| JP | 2004364286 A | 12/2004 |
| JP | 2005198214 A | 7/2005 |
| JP | 2005528002 A | 9/2005 |
| JP | 2005295401 A | 10/2005 |
| JP | 2006507753 | 3/2006 |
| JP | 2006197375 A | 7/2006 |
| WO | WO0105088 A1 | 1/2001 |
| WO | WO2004027921 A2 | 4/2004 |
| WO | WO2004045102 A1 | 5/2004 |
| WO | WO2005002073 A1 | 1/2005 |
| WO | WO2005002141 A1 | 1/2005 |
| WO | WO2005006700 A1 | 1/2005 |
| WO | WO2005022760 A1 | 3/2005 |

OTHER PUBLICATIONS

Office Action in U.S. Appl. No. 11/139,925 dated Apr. 1, 2008, 22 pages.

Andren et al.: CCK, The new IEEE 802.11 standard for 2.4 GHz wireless LANs, International IC Conf. Proceedings, pp. 25-39, May 3, 2000.

Bangerter, Boyd et al.: "High-Throughput Wireless LAN Air Interface", 2003, Intel Technology Journal, vol. 7, No. 3, pp. 47-57.

Boer, Jan, et al., "Backwards compatability: How to make a MIMO-OFDM system backwards compatible and coexistence with 11a/g at the link level", 2003, IEEE 802.11-03/714r0, slides 1-26.

Chinese Office Action mailed Feb. 28, 2011 for Chinese application No. 200580049854.8, 26 pages.

Chinese Office Action mailed Sep. 1, 2010 for Chinese Patent Application No. 200580049854.8, 27 pages.

European OA dated Jan. 24, 2008 for EP Application Serial No. 05 729 464.7-2415, 2 pages.

European OA dated Aug. 18, 2008 for EP Application Serial No. 05 729 464.7-2415, 17pages.

Halls, G. A., "Hiperlan—The 20 MBIT/S Radio Lan," IEE Colloquim on Radio LANs and MANs . . . , pp. 1-8 (1995).

IEEE, Part 11: Wireless LAN Medium Access Control (MAC) and Physical Layer (PHY) Specifications. 1999, IEEE, chapters 9 and 11.*.

IEEE Std 802.11-1999 (Reaff 2003), "Part 11: Wireless LAN Medium Access Control (MAC) and Physical Layer (PHY) Specifications," LAN MAN Standards Committee of the IEEE Computer Society; Paragraphs 7.2.3.1 and 7.2.3.9; Paragraph 7.3.2.4; Paragraphs 15.4.6.2 and 18.4.6.2.

IEEE Std 802.11b-1999, "Part 11: Wireless LAN Medium Access Control (MAC) and Physical Layer (PHY) specifications: Higher-Speed Physical Layer Extension in the 2.4 GHz Band," IEEE-SA Standards Board, Supplement to ANSI/IEEE Std. 802.11, 1999 Edition, Approved Sep. 16, 1999.

James Gardner et at., Non-Final Office Action, U.S. Appl. No. 10/820,440, US-Nov. 28, 2008.

Larsson, Erik G. et al.: "Preamble Design for Mulitple-Antenna OFDM-Based WLANs With Null Subcarriers", 2001, IEEE Signal Processing Letters, 8:11:285-288.

Li, Ye G. et al.: "Channel Estimation for OFDM Systems with Transmitter Diversity in Mobile Wireless Channels", 1999, IEEE J. Select Areas Commun., 17: 461-471.

M. Singh et al., "WWiSE Proposal: High throughput extension to the 802.11 Standard", Nov. 12, 2004, pp. 32-43, §20.3, IEEE 802.11-04/0886r5.

Mujtaba, Aon et al, "TGn Sync Proposal", IEEE 802.11-04/888r0, Aug. 2004.

Negi, Rohit et al.: "Pilot Tone Selction for Channel Estimation in a Mobile OFDM System", 1998, IEEE Trans. Consumer Electron, 44: 1122-1128.

Office Action for Japanese Patent Application Serial No. 2008-502955 dated Jun. 1, 2010, 4 pages.

Office Action for Japanese Patent Application Serial No. 2008-502955 dated Mar. 8, 2011, 2 pages.

Office Action mailed Feb. 19, 2010 for European Patent Application No. 05729464.7, 45 pages.

Syed Aon Mujtaba, Agere Systems, et al., "TGn Sync Complete Proposal", Jan. 18, 2005, pp. 24-42, IEEE 802.11-04/888r8.

Syed Aon Mujtaba, Agere Systems, "TGn Sync Proposal Technical Specification", Jan. 18, 2005, pp. 110-135, §11, IEEE 802.11-04/0889r3.

Talisa, S.H et al.: "A Novel MSW Programmable Barker Coder/Decoder," Microwave Symposium Digest, MTT-S International, vol. 86, Issue: 1, Jun. 2, 1986, pp. 579-581.

Tung, Tai-Lai et al: "Channel Estimation and Adaptive Power Allocation for Performance and Capacity Improvement of Multiple-Antenna OFDM Systems", 2001, Proc. IEEE Signal Processing Workshop on Signal Processing Advances in Wireless Comm. 82-85.

Van Nee, Richard et al.: "New High-Rate Wireless LAN Standards", 1999, IEEE Commun. 37 82-88.

* cited by examiner $$L1 = \{\ 0\ \ 1\ \ -1\ \ -1\ \ 1\ \ 1\ \ -1\ \ 1\ \ -1\ \ 1\ \ -1\ \ -1\ \ -1\ \ -1\ \ -1\ \ 1$$
$$1\ \ -1\ \ -1\ \ 1\ \ -1\ \ 1\ \ -1\ \ 1\ \ 1\ \ 1\ \ 1\ \ 0\ \ 0\ \ 0\ \ 0\ \ 0$$
$$0\ \ 0\ \ 0\ \ 0\ \ 0\ \ 0\ \ 1\ \ 1\ \ -1\ \ -1\ \ 1\ \ 1\ \ -1\ \ 1\ \ -1\ \ 1$$
$$1\ \ 1\ \ 1\ \ 1\ \ 1\ \ -1\ \ -1\ \ 1\ \ 1\ \ -1\ \ 1\ \ -1\ \ 1\ \ 1\ \ 1\ \ 1\ \}$$

3 TX case

4 TX case

DETECTING THE NUMBER OF TRANSMIT ANTENNAS IN WIRELESS COMMUNICATION SYSTEMS

CROSS-REFERENCE TO RELATED APPLICATIONS

The present application is a Continuation of U.S. application Ser. No. 11/139,925, filed May 27, 2005, entitled "DETECTING THE NUMBER OF TRANSMIT ANTENNAS IN WIRELESS COMMUNICATION SYSTEMS" which is a Non-Provisional of U.S. Provisional Application No. 60/575,608, filed May 27, 2004, entitled "MODIFIED PREAMBLE STRUCTURE FOR IEEE 820.11A EXTENSIONS AND DETECTING THE NUMBER OF TRANSMIT ATTENAS IN MIMO OR MISO COMMUNICATION SYSTEMS", the content of each is hereby incorporated by reference in its entirety.

The present application is also related to co-pending U.S. application Ser. No. 10/820,440, filed Apr. 5, 2004, entitled "MODIFIED PREAMBLE STRUCTURE FOR IEEE 802.11A EXTENSIONS TO ALLOW FOR COEXISTENCE AND INTEROPERABILITY BETWEEN 802.11A DEVICES AND HIGHER DATA RATE, MIMO OR OTHERWISE EXTENDED DEVICES", the contents of which is incorporated herein by reference in its entirety.

BACKGROUND OF THE INVENTION

Demand for wireless digital communication and data processing systems is on the rise. Inherent in most digital communication channels are errors introduced when transferring frames, packets or cells containing data. Such errors are often caused by electrical interference or thermal noise. Data transmission error rates depend, in part, on the medium which carries the data. Typical bit error rates for copper based data transmission systems are in the order of $10^{-6}$. Optical fibers have typical bit error rates of $10^{-9}$ or less. Wireless transmission systems, on the other hand, may have error rates of $10^{-3}$ or higher. The relatively high bit error rates of wireless transmission systems pose certain difficulties in encoding and decoding of data transmitted via such systems. Partly because of its mathematical tractability and partly because of its application to a broad class of physical communication channels, the additive white Gaussian noise (AWGN) model is often used to characterize the noise in most communication channels.

Data is often encoded at the transmitter, in a controlled manner, to include redundancy. The redundancy is subsequently used by the receiver to overcome the noise and interference introduced in the data while being transmitted through the channel. For example, the transmitter might encode k bits with n bits where n is greater than k, according to some coding scheme. The amount of redundancy introduced by the encoding of the data is determined by the ratio n/k, the inverse of which is referred to as the code rate.

In a multiple-input multiple-output (MIMO) system, the transmitter includes multiple transmit antennas and the receiver includes multiple receive antennas. A MIMO system is typically used to increase the data rate, diversity, or a combination thereof. The increase in data rate is achieved by transmitting multiple data streams via the multiple transmit antennas, also known as spatial multiplexing. The diversity is achieved by increasing the redundancy between the transmit antennas through joint coding.

The IEEE 802.11a standard defines data rates of 6 Mbps (megabits per second) up to 54 Mbps. For some applications, higher data rates for given modulations and data rates higher than 54 Mbps are desirable. Other extensions, such as the use of MIMO systems and other extensions might be desirable. In order to avoid conflicts with existing standardized communications and devices, extended devices that extend beyond the limits of the 802.11a standard and legacy devices that comply with the existing standard and are not necessarily aware of extended standards both need to coexist in a common communication space and interoperate at times.

Coexistence occurs where different devices can operate in a common space and perform most of their functions. For example, an extended transmitter transmitting to an extended receiver might coexist with a legacy transmitter transmitting to a legacy receiver, and the extended devices can communicate while the legacy devices communicate, or at least where the two domains are such that one defers to the other when the other is communicating. Coexistence is important so that the adoption and/or use of extended devices (i.e., devices that are outside, beyond or noncompliant with one or more standards with which legacy devices adhere and expect other devices to adhere) do not require replacement or disabling of existing infrastructures of legacy devices.

Interoperability occurs where an extended device and a legacy device can communicate. For example, an extended transmitter might initiate a transmission in such a manner that a legacy device can receive the data sent by the extended transmitter and/or indicate that it is a legacy device so that the extended transmitter can adjust its operations accordingly. For example, the extended transmitter might revert to standards compliant communications or switch to a mode that, while not fully standards compliant, is available to the legacy receiver. In another situation, an extended receiver might successfully receive data from a legacy transmitter.

The IEEE 802.11a standard defines a 20 microsecond long preamble with a structure as shown in FIG. 1, having short training symbols S (0.8 microseconds each), a guard interval LG, long training symbols L (3.2 microseconds each) and a signal field (4 microseconds). The preamble is followed by data. The first eight microseconds include ten identical short training symbols that are used for packet detection, automatic gain control and coarse frequency estimation. The second eight microseconds include two identical long training symbols, L, preceded by a guard interval LG that is the same pattern as the last half (1.6 microseconds) of the long training symbol L. The long training symbols can be used for channel estimation, timing, and fine frequency estimation.

FIG. 2 shows a long training sequence, $L_1$, that is used to generate the signal representing the long training symbol in a conventional 802.11a preamble. This sequence represents values used over a plurality of subcarriers. As specified in the standard, the subcarriers span a 20 MHz channel and with 64 subcarriers, they are spaced apart by 312.5 kHz. By convention, used here, the first value in the sequence is the value for the DC subcarrier, followed by the value for the 1×312.5 kHz subcarrier, then the value for the 2×312.5=625 kHz subcarrier, etc., up to the 32nd value for the 31×312.5 kHz=9687.5 kHz subcarrier. The 33rd value corresponds to the −10 MHz subcarrier, followed by the −(10 MHz−312.5 kHz) subcarrier, and so on, with the 64 value being for the −312.5 kHz subcarrier. As can be seen from FIG. 1, the DC value and the 28th through 38th values, corresponding to the edges of the 20 MHz channel, are zero.

One approach to obtaining higher data rates is the use of more bandwidth. Another approach, used by itself or as well as the use of more bandwidth, is MIMO channels, where a plurality of transmitters transmit different data or the same data separated by space to result in possibly different multipath reflection characteristics. When using MIMOs or MISOs, a number of advantages are gained by detecting the number of transmit antennas at the receiver.

BRIEF SUMMARY OF THE INVENTION

In accordance with one embodiment of the present invention, each of a number of preambles is adapted to be used in packets sent over a wireless network, such as an 802.11a compliant wireless network, to enable detection of the number of transmit antennas. Packets containing preambles of the present invention may be received by extended devices as well as by legacy receivers that are not configured to receive and interpret these preambles. The detection of the number of transmit antennas provides a number of advantages, such as enabling the estimation of the MIMO channel, synchronization of various transmitters and/or receivers, management of the application of power to various components disposed in the transmitters/receivers, and allocation of memory as well as other resource between various components of the receiver/transmitters.

In one embodiment, extended-long training (ELT) symbols disposed in the preamble are cyclically-shifted ELT symbols and transmitted on different transmit antennas. At the receiver (RX), if the received symbols are detected as matching the known ELT symbols, a sum of shifted channel impulse responses corresponding to the channels from the different TX antennas is attained. The time shift associated with the channel impulse response at the receiver indicates the number of times the ELT symbols are cyclically shifted and thus represent the number of transmit antennas. In other words, by detecting the number of shifts; in the channel impulse response at the receiver, the number of TX antennas is estimated. The ELT symbols may be selected to be the same as the 802.11a long training symbols, but other long training symbols such as long training symbols where, next to the 802.11a subcarriers, the out-of-band tones, i.e., the 28th through 38th subcarriers are disposed, may be used.

To detect the number of transmit antennas at the receiver, a fast Fourier transform (FFT) operation is performed on the received samples of the transmitted ELT symbols. Next, each subcarrier $y_q(i)$ is multiplied with the associated subcarrier frequency-domain representation of the ELT symbol with a cyclic shift of zero so as to remove the effect of the ELT and obtain a frequency-domain representation of the sum of shifted impulse responses. Next, inverse Fourier transform or least squares (LS) operation is performed on the multiplied values to compute the transmission channel impulse response. The LS operation may be employed when fewer than all the tone of the ELT are used. The channel impulse response includes a sum of cyclically shifted impulse responses corresponding to the multiple transmit antennas. The number of cyclically shifted impulse responses in the channel impulse response represents the number of transmit antennas.

DETAILED DESCRIPTION OF THE INVENTION

In accordance with one embodiment of the present invention, each of a number of preambles is adapted to be used in packets sent over a wireless network, such as an 802.11a compliant wireless network, to enable detection of the number of transmit antennas. Packets containing preambles of the present invention may be received by extended devices as well as by legacy receivers that are not configured to receive and interpret these preambles. The detection of the number of transmit antennas provides a number of advantages, such as enabling the estimation of the MIMO channel, synchronization of various transmitters and/or receivers, management of the application of power to various components disposed in the transmitters/receivers, and allocation of memory as well as other resource between various components of the receivers/transmitters. The following description is provided with reference to MIMO systems, however, it is understood that the invention equally applies to the multiple-input single-output (MISO) systems.

In accordance with some embodiments of the present invention, extended-long training (ELT) symbols disposed in the preamble are cyclically-shifted ELT symbols and transmitted on different transmit antennas. At the receiver (RX), if the received symbols are detected as matching the known ELT symbols, a sum of shifted channel impulse responses corresponding to the channels from the different TX antennas is attained. The time shift associated with the channel impulse response at the receiver indicates the number of times the ELT symbols are cyclically shifted and thus represent the number of transmit antennas. In other words, by detecting the number of shifts in the channel impulse response at the receiver, the number of TX antennas is estimated.

Figure 3:
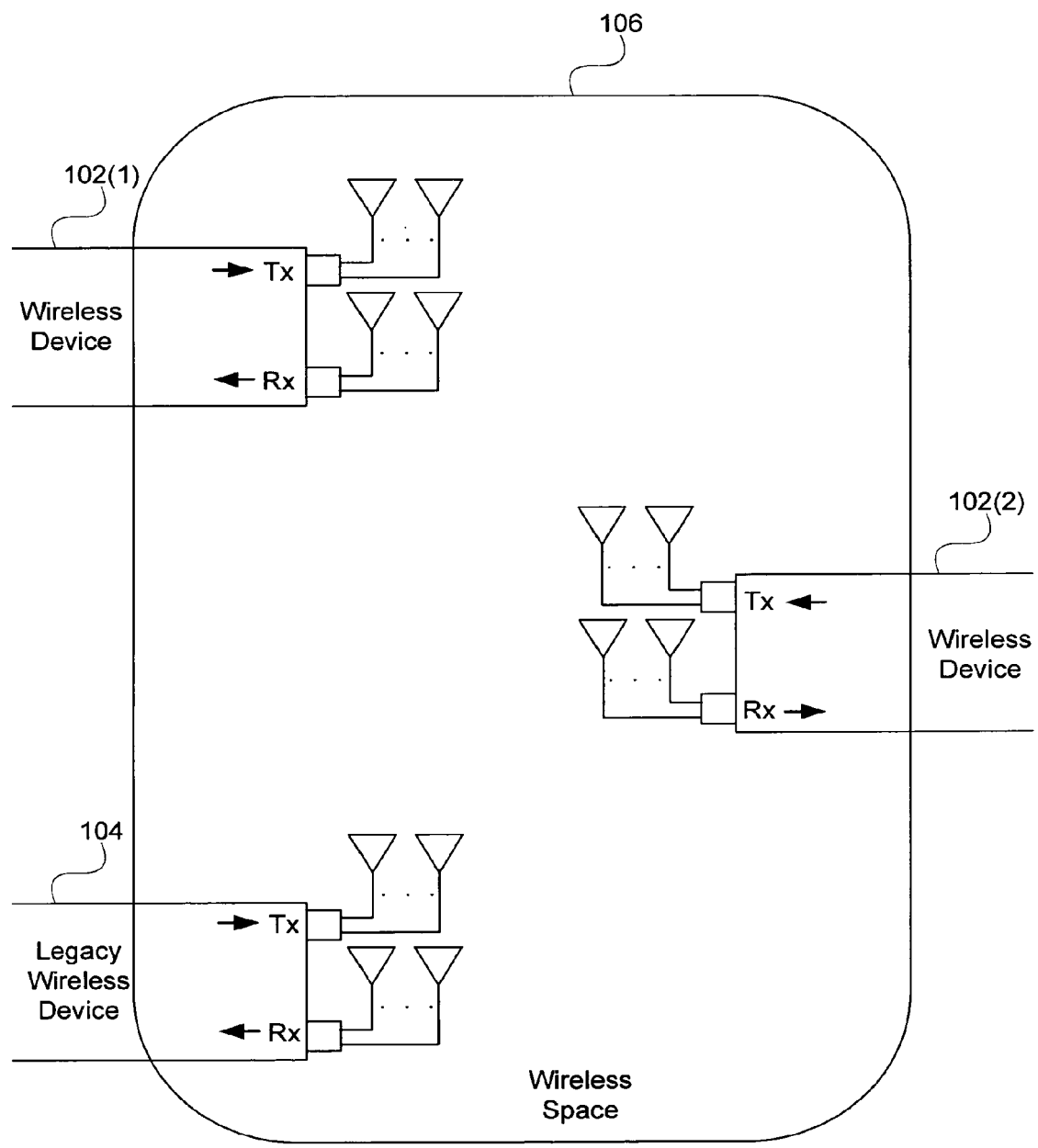
FIG. 3 shows a number of devices coupled via a wireless network.

FIG. 3 shows an exemplary wireless network used for communications among transmitters and receivers as indicated. As shown, two wireless devices 1021, 1022 might use and interpret the modified preambles, while a legacy wireless device 104 might not be expecting the modified preambles, but might hear signals representing such preambles. Extended wireless devices 102 might operate using multiple channels and/or multiple transmit antennas and/or multiple receive antennas. While separate transmit and receive antennas are shown, antennas might be used for both transmitting and receiving in some devices.

Border 106 is not a physical border, but is shown to represent a space within which signals can be received from devices within the space. Thus, as one device transmits a signal representing a packet within border 106, other devices within border 106 pick up the signals and, as they are programmed, will attempt to determine if the signals represent packets and if so, then demodulate/decode the packets to obtain the transmitted data.

The algorithm adapted to detect the number of transmit antennas is described below with reference to a preamble with ELT symbols that are cyclically-shifted and transmitted from each of the transmit antennas of the MIMO system. In other words, the ELT symbols of the preamble are first transmitted from a first one of the transmit antennas and are thereafter cyclically-shifted the same number as the number of remaining transmit antennas of the MIMO system and subsequently transmitted from each such transmit antenna. It is understood, however, that the algorithm may also be applied to other training symbols.

To detect the number of transmit antennas at the receiver, a fast Fourier transform (FFT) operation is performed on the received samples of the transmitted ELT symbols. Assume $r_q(n)$ represents the n-th received time-domain sample on the q-th receive antenna. Further assume that the FFT window of the training symbols includes $N_c$ samples, and the first sample of this FFT window corresponds to n=0. Applying the FFT yields the following equation (1):

$$y_q(i) = C_1 \sum_{n=0}^{N_c-1} r_q(n) \exp\left(-j2\pi \frac{in}{N_c}\right) \quad (1)$$

where $y_q(i)$ represents the received information on receive antenna q and subcarrier i, and $C_1$ is a normalization constant.

Next, each subcarrier $y_q(i)$ is multiplied with the associated subcarrier frequency-domain representation of the ELT symbol so as to remove the effect of the ELT and to maintain the channel information. Assume $x_p(i)$ is the frequency-domain representation of the training symbol on subcarrier i and transmit antenna p (or spatial stream p). In the following, it is assumed that a direct mapping of $N_s$ spatial streams to $N_t$ transmit antennas occurs, therefore $N_s=N_t$, although it is understood that the present invention may be readily applied to more general space-time-frequency mappings where the $N_s$ spatial streams are not directly mapped to the $N_t$ transmit antennas. The training symbol is assumed to be a known reference to both the transmitter and receiver. Moreover, without loss of generality, it is assumed that no cyclic shift is applied to transmit antenna 1. Accordingly, the received frequency-domain information is multiplied by the conjugate of $x_1(i)$ to obtain the following:

$$y'_q(i) = y_q(i) x_1^*(i) \quad (2)$$

where f(*) denotes the complex conjugation operation. Next, without loss of generality it is assumed that $x_p(i)$ utilizes all subcarriers. Hence, an inverse FFT (IFFT) can be performed to transform the frequency domain values of equation (2) into time domain values, as shown below:

$$r'_q(n) = C_2 \sum_{i=0}^{N_c-1} y'_q(i) \exp\left(j2\pi \frac{in}{N_c}\right) \quad (3)$$

where $C_2$ is a normalization constant.

Neglecting contributions due to noise, equation (3) may be rewritten as shown below:

$$\begin{aligned} r'_q(n) &= C_2 \sum_{i=0}^{N_c-1} y'_q(i) \exp\left(j2\pi \frac{in}{N_c}\right) \\ &= C_2 \sum_{i=0}^{N_c-1} \left(\sum_{p=1}^{N_t} h_{f\_qp}(i) x_p(i)\right) x_1^*(i) \exp\left(j2\pi \frac{in}{N_c}\right) \\ &= C_3 \sum_{p=1}^{N_t} h_{t\_qp}(n - s_p), \end{aligned} \quad (4)$$

where $h_{t\_qp}(n)$ is the time-domain representation of the communication channel between transmitter p and receiver q, in other words, the impulse response of the communication channel between transmitter p and receiver q, and sp denotes the cyclic shift in samples applied to the p-th transmit antenna. $C_3$ is a normalization constant.

The above computations determine the degree of time-shift, if any, of the channel impulse response as detected by the receiver. In order to improve the accuracy of such a detection, cyclic window integration may be applied. Assume w(n) represents a window of $N_w$ samples long. Accordingly, a cyclic window integration over the power of $r'_q(n)$, i.e., $|r'_q(n)|^2$, with n=0, 1, ... $N_c$−1, yields the following:

$$a(n) = \sum_{k=0}^{N_w-1} |r'_q((n+k) \bmod N_c)|^2 w(N_w - 1 - k) \quad (5)$$

where mod is the modulo operator. It is understood that instead of using power of $r'_q(n)$ in the above equation, one may use, for example, the amplitude of $r'_q(n)$ or any other suitable measure. The maximum values meeting defined criteria in the intervals of expression (5) indicate the presence or absence of impulse responses in these intervals. The intervals are selected so as to match the various expected cyclic shifts of the ELT symbols.

Figure 4A:
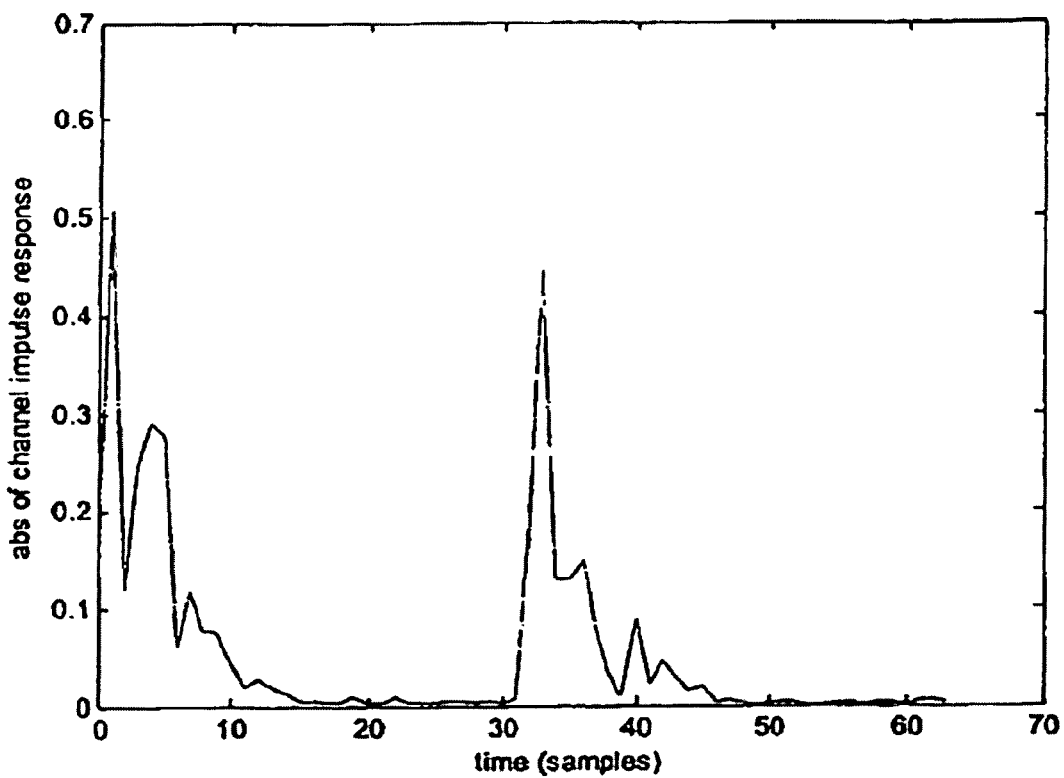
FIG. 4A is a plot of the absolute values of the channel impulse response of a two-transmitter system, determined in accordance with one embodiment of the present invention.
Figure 4B:
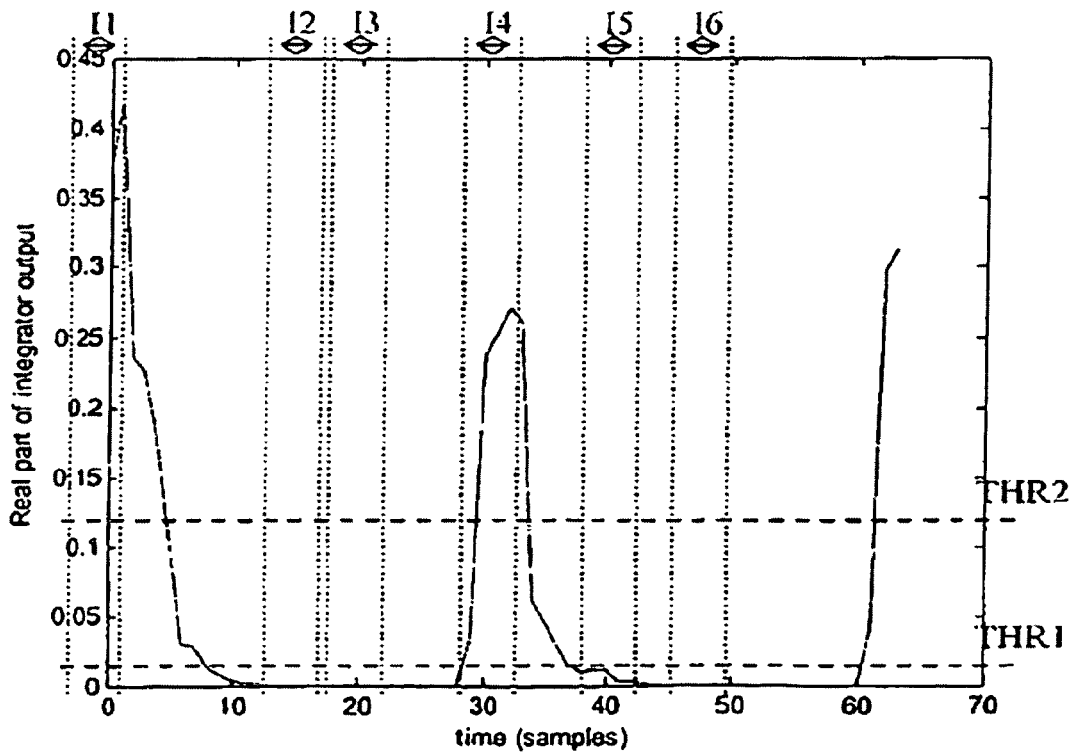
FIG. 4B is a plot of the real parts of a window integration of the powers of the values used in FIG. 4A, in accordance with one embodiment of the present invention.

The following is an exemplary pseudo-code adapted to detect the number of transmit antennas of a MIMO system by determining the presence of maximum values in the various intervals associated with the cyclic integration windows, as defined in expression (5) above. The exemplary pseudo-code below assumes that the MIMO system includes no more than four transmit antennas. It is understood, however, that the following pseudo-code may be readily modified to detect the number of transmit antennas in a MIMO system having any number of transmit antennas. Assume that {M1, M2, ..., M6} represent the maximum values in each of intervals {I1, I2, ..., I6} as shown in FIG. 4B for this example. Accordingly, the number of transmit antennas is detected as shown below:

```
(1)  {{if ((M2 > THR1) AND (M3 > THR1) AND (M4 > THR1)) N_t = 4
(2)   elseif ((M5 > THR1) AND (M6 > THR1)) N_t = 3
(3)   elseif (M3 > THR1) N_t = 2
(4)   else N_t = 1
(5)   if ((M2 > THR2) OR (M4 > THR2)) N_t = 4
(6)   elseif ((M5 > THR2) OR (M6 > THR2)) N_t = 3
(7)   if (mean(M2, M3, M4) > mean(M5, M6)) N_t = 4
(8)   elseif (mean(M5,M6) > M3) N_t = 3
(9)   if (max(M1,M2,M3,M4) < THR3*min(M1,M2,M3,M4)) N_t = 4
(10)  elseif (max(M1,M5,M6) < THR3*min(M1,M5,M6)) N_t = 3
(11)  elseif (max(M1,M3) < THR3*min(M1,M3)) N_t = 2
(12)  else N_t = 1}}
```

In the above pseudo-code, parameters THR1, THR2 and THR3 represent adjustable threshold values that may vary with the noise power. An estimate of the noise power may be obtained by subtracting the received samples corresponding to two (or more) subsequent equivalent training symbols and calculating the power of the result.

Lines 1-4 of the above pseudo-code, defining the first comparison rule, determine the maximum values that are above the designated threshold values(s) or noise floors. Lines 5-6, defining the second comparison rule, are used to verify whether certain peaks are above a higher threshold, thus ensuring that even if the peak (maximum) values are below the noise floor, the correct number of transmit antennas is detected. Lines 7-8 are used to distinguish between three TX and four TX case because for high delay spread cases in the event the first two comparison rules fail. Lines 9-12, defining the fourth comparison rule, are used to ensure that the highest and the lowest peak values are within a certain range (e.g., 15 or 20 dB). This is particularly important to distinguish between the one TX and two TX cases.

Depending on the number of TX antennas, the result of the above computations contains a sum of time-shifted impulse responses. FIG. 4A shows the result of such computations when $N_t=2$, $N_c=64$, $s_1=0$ and $s_2=32$. In other words, in the computations associated with data shown in FIG. 4A, the cyclic shift of the ELT symbol at the first TX antenna is 0 samples and that at the second TX antenna is 32 samples at a sampling rate of 20 MHz or, equivalently, 1.6 μs. When there are three transmit antennas, the shifts may be, e.g., 0, 21, and 42 samples; when there are four transmit antennas, the shifts may be, e.g., 0, 16, 32, and 48 samples, respectively, as understood by those skilled in the art. The absolute values of the complex numbers of the two TX channel impulse response is used in the plot of FIG. 4B.

In accordance with equation (5), for a window of 4 samples, integrating the square powers of the values shown in FIG. 4A results in the real parts as shown in FIG. 4B. Therefore, as described above, equation (5) may be used after equation (4) to improve the accuracy of the detection. For an interval size of 4 samples, the intervals for all possible shifts as mentioned in the exemplary pseudo code above are {I1, I2, I3, I4, I5, I6}={0-3, 16-19, 21-24, 32-35, 42-45, 48-51}, as shown in FIG. 4B.

Figure 5A:
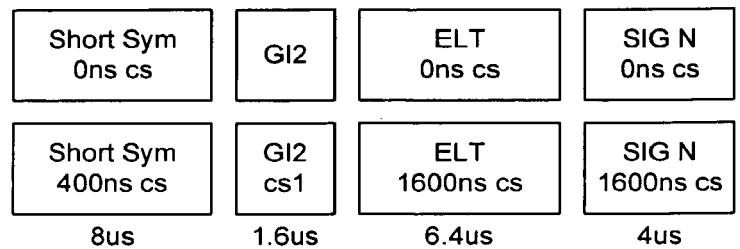
FIGS. 5A, 5B and 5C show modified preambles with cyclic shifts adapted to be used by a receiver of a communication system having a multitude of transmit antenna systems to detect the number of transmitters of such a system, in accordance with one embodiment of the present invention.
Figure 5B:
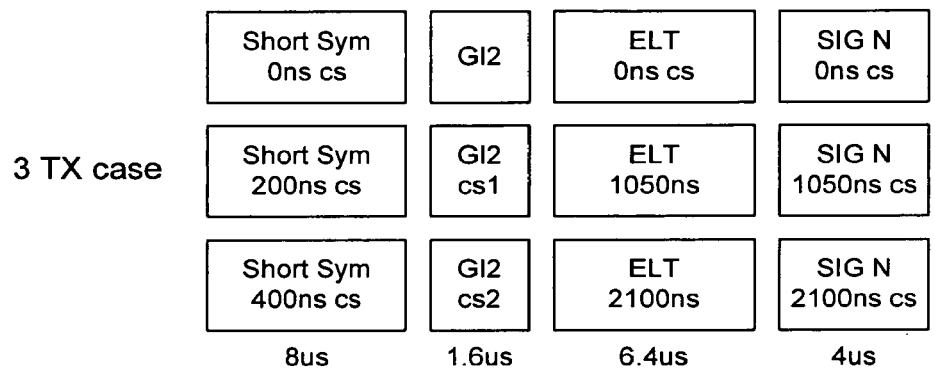
Figure 5C:
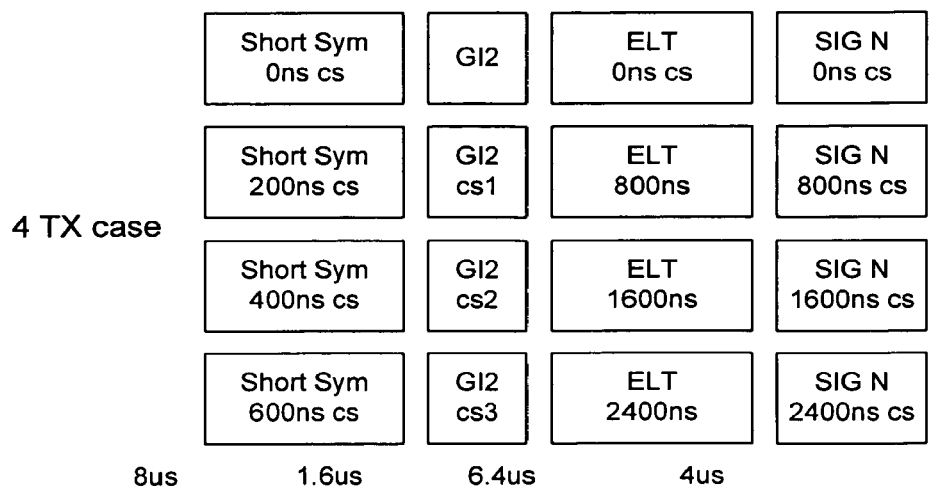

FIGS. 5A, 5B and 5C respectively show cyclically shifted preambles adapted for transmission from systems having respectively 2, 3 and 4 transmit antennas. As used herein, a sequence in the frequency domain is expressed with uppercase letters (e.g., L(i)), while the corresponding time sequence is expressed with lowercase letters (e.g., l(i)).

The preambles which enable or enhance coexistence of MIMO packets in legacy devices include a cyclic delay shift applied to the ELT as well as Signal field prior to applying the guard time extension. For example, assume L(i) and D(i) are the 64 subcarrier values for the ELT and Signal field symbols, respectively. For a conventional 802.11a single transmitter transmission, the time samples for the long training symbol are derived by taking the 64-point IFFT of L(i) to obtain l(n) and transmitting the samples of l(n). Thus, with the guard time, the ELT symbol and guard time are constructed as [l(32:63) l(0:63) l(0:63)], i.e., the IFFT output is repeated twice and the last 32 samples are prefixed to form the long training guard interval. As with the conventional timing, the long training guard interval (32 samples) is twice as long as the guard interval for 802.11a data symbols (16 samples). The signal field is formed by [d(48:63) d(0:63)], where d(0:63) are the 64 samples of the IFFT of D(i).

In the case of an exemplary two transmitter MIMO device, the first transmitter transmits the long training symbol and signal field, as is the case with an of 802.11a transmission. The second transmitter, however, applies a cyclic shift such that instead of the IFFT output l(0:63), the cyclically shifted samples ls=[l(32:63) l(0:31)] are used to construct the long training symbol samples [ls(32:63) ls(0:63) ls(0:63)]. With respect to the signal field, the shifted samples ds=[d(32:63) d(0:31)] are used to construct the signal field as [ds(48:63) ds(0:63)].

Figures 1, 2:
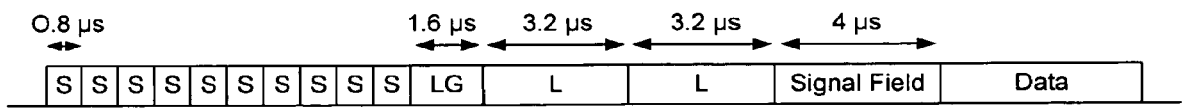
FIG. 1 shows the preamble of a conventional 802.11a standard, as known in the prior art.
FIG. 2 shows the frequency domain symbols of a long training symbol sequence starting with the DC subcarrier used in the 802.11a preamble of FIG. 1, as known in the prior art.

In a legacy 802.11a packet, one 3.2 microsecond repetition of the long training symbol L as shown in FIG. 1 is expressed in the time domain as the IFFT of L(i), where L(i) contains 64 subcarrier values, of which 52 are non-zero. The time samples l(n) are given as shown in equation (6):

$$l(n) = \sum_{i=0}^{63} L(i)\exp\left(j\frac{2\pi in}{64}\right) \quad (6)$$

In accordance with the preambles adapted for detection of the number of transmit antennas as well as for extended modes operations, L(i) may contain more than 52 non-zero subcarriers. Furthermore, in the case of MIMO transmission, l(n) may have a cyclic shift that may be different for each transmitter. The shifted signal $l_k(n)$ can be derived from l(n) as $l_k(n)=l([n+64-s_k]\% \, 64)$, where "%" denotes the modulo operator and $s_k$ is the cyclic delay of transmitter k in 20 MHz samples. This expression assumes a 20 MHz sampling rate, such that there are 64 samples in a 3.2 microsecond interval. An alternative method of generating the cyclic shift is to apply a phase ramp rotation to all subcarrier values of L(i) prior to calculating the IFFT, such as that shown in equation (7) below:

$$l_k(n) = \sum_{i=0}^{63} L(i)\exp\left(-j\frac{2\pi i s_k}{64}\right)\exp\left(j\frac{2\pi in}{64}\right) \quad (7)$$

For a MIMO system with two transmit antennas and two different transmit data streams, cyclic delay values $s_k$ may be 0 and 32 samples, respectively, corresponding to a cyclic delay of 1.6 microseconds between the two transmitters. For three transmitters, $s_k$ may be 0, 21, and 42 samples, respectively. For four transmitters, $s_k$ may be 0, 16, 32, and 48 samples, respectively.

Figure 6:
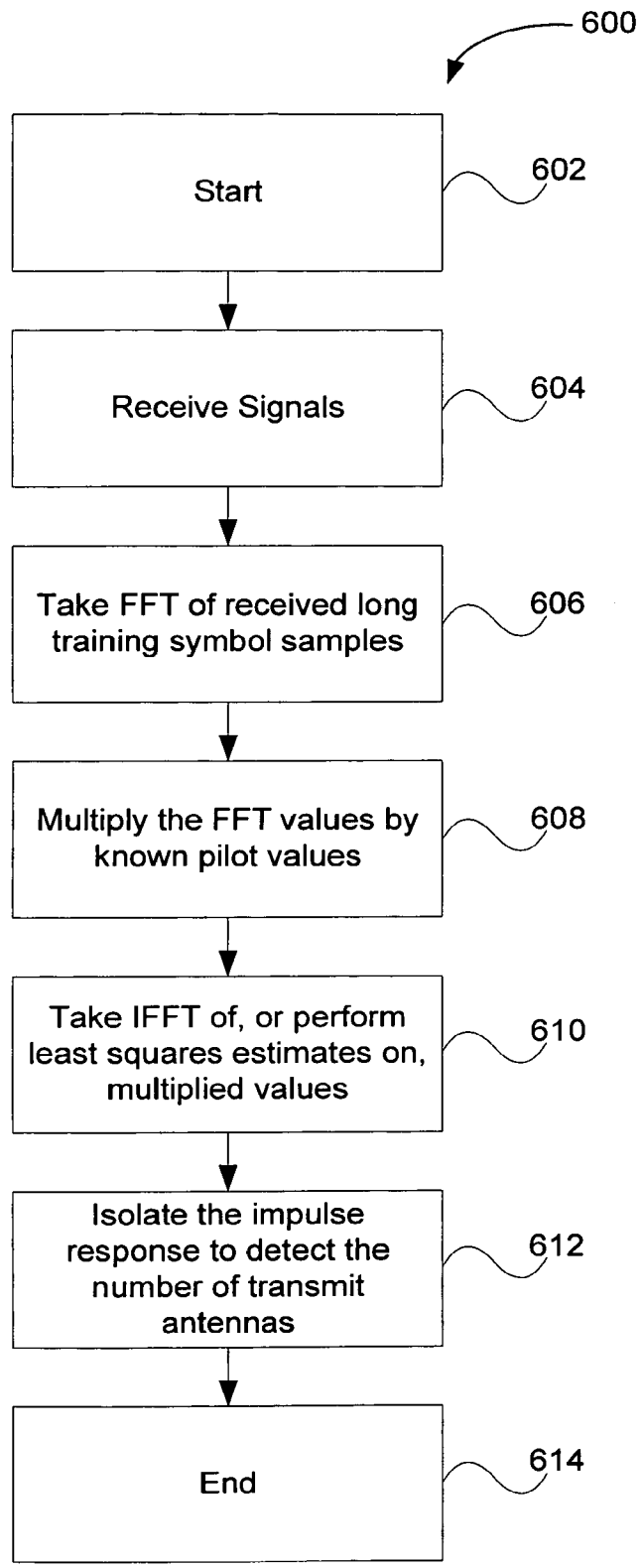
FIG. 6 is a flow-chart of steps used to detect the number of transmit antennas of a communication system having a multitude of transmit antennas, in accordance with one embodiment of the present invention.

FIG. 6 shows a flowchart 600 of steps carried out to detect the number of transmit antennas. The process starts at step 602. At step 604, the transmitted ELT symbols are received. At step 606 an FFT operation is performed on the received samples of the transmitted ELT symbols, possibly averaged over the two consecutive ELT symbols. At step 606 the FFT values are multiplied with known frequency-domain representation of the training symbols on each sub-carrier of the reference transmit antenna, herein assumed transmit antenna 1. At step 608, an inverse FFT or LS estimate is performed on the multiplied results to transform the frequency domain values of equation (2) into time domain values. At step 612, the number of shifted impulse responses in the channel impulse response are isolated to determine the number of transmit antennas. The process ends at step 614.

The above embodiments of the present invention are illustrative and not limiting. Various alternatives and equivalents are possible. The invention is not limited by the type of encoding, decoding, modulation, demodulation, equalization, filtering, etc., performed. The invention is not limited to the number of transmit or receive antennas. The invention is not limited by the rate used to transfer the data. The invention is not limited by the type of integrated circuit in which the present disclosure may be disposed. Nor is the disclosure limited to any specific type of process technology, e.g., CMOS, Bipolar, or BICMOS that may be used to manufacture the present disclosure. Other additions, subtractions or modifications are obvious in view of the present disclosure and are intended to fall within the scope of the appended claims.

What is claimed is:

1. A method, comprising:
receiving samples of training symbols that are cyclically shifted with respect to one another and transmitted from a plurality of transmit antennas;
performing Fourier transform operations on the received samples of the training symbols to generate frequency-domain values associated with the received samples;
multiplying the associated frequency-domain values of the received samples with known frequency-domain representations of the training symbols on each sub-carrier of a reference transmit antenna to generate multiplied values;
computing a transmission channel impulse response, wherein computing the transmission channel impulse response includes performing a least square operation on the multiplied values; and
detecting a number of shifted impulse responses in the transmission channel impulse response, wherein the detected number of shifted impulse responses represents a number of the transmit antennas.

2. A method, comprising:
receiving samples of training symbols that are cyclically shifted with respect to one another and transmitted from a plurality of transmit antennas;
performing Fourier transform operations on the received samples of the training symbols to generate frequency-domain values associated with the received samples;
multiplying the associated frequency-domain values of the received samples with known frequency-domain representations of the training symbols on each sub-carrier of a reference transmit antenna to generate multiplied values;
computing a transmission channel impulse response, wherein computing the transmission channel impulse response includes performing an inverse Fourier transform operation on the multiplied values; and
detecting a number of shifted impulse responses in the transmission channel impulse response, wherein the detected number of shifted impulse responses represents a number of the transmit antennas.

3. A method, comprising:
receiving samples of training symbols that are cyclically shifted with respect to one another and transmitted from a plurality of transmit antennas;
performing Fourier transform operations on the received samples of the training symbols to generate frequency-domain values associated with the received samples;
multiplying the associated frequency-domain values of the received samples with known frequency-domain representations of the training symbols on each sub-carrier of a reference transmit antenna to generate multiplied values;
computing a channel impulse response;
detecting a number of shifted impulse responses in the transmission channel impulse response, wherein the detected number of shifted impulse responses represents a number of the transmit antennas;
applying cyclic window integration on the channel impulse response; and
detecting a presence or absence of a peak value in each cyclic window associated with the integration to detect the number of shifted impulse responses in the channel impulse response.

4. The method of claim 3, further comprising:
establishing one or more threshold values to define one or more matching rules to detect a presence or absence of a peak value in each cyclic window.

5. The method of claim 4, wherein the one or more threshold values and the one or more matching rules are variables.

6. The method of claim 3, wherein a frequency-domain value on a receive antenna q and a subcarrier i is defined by:

$$y_q(i) = C_1 \sum_{n=0}^{N_c-1} r_q(n)\exp\left(-j2\pi \frac{in}{N_c}\right)$$

wherein $r_q(n)$ represents an n-th received time-domain sample on a q-th receive antenna,
wherein a Fourier transform window of the training symbols includes $N_c$ samples, and a first sample of the Fourier transform window corresponds to n=0,
wherein $C_1$ is a normalization constant; and
wherein computing the channel impulse response includes performing a least square operation on the multiplied values.

7. The method of claim 6, wherein each multiplied value is defined by:

$$y'_q(i) = y_q(i) x_1^*(i)$$

wherein $x^*_1(i)$ represents a frequency-domain representation on the subcarrier i of a training symbol without cyclic shift, and wherein $x^*_1(i)$ is a complex conjugate of $x_1(i)$.

8. The method of claim 7, wherein a time-domain representation of the channel impulse response is further defined by:

$$r'_q(n) = C_2 \sum_{i=0}^{N_c-1} y'_q(i)\exp\left(j2\pi \frac{in}{N_c}\right)$$

wherein $C_2$ is a normalization constant.

9. The method of claim 8, wherein the time-domain representation of the channel impulse response is further defined by:

$$r'_q(n) = C_2 \sum_{i=0}^{N_c-1} y'_q(i)\exp\left(j2\pi \frac{in}{N_c}\right)$$
$$= C_2 \sum_{i=0}^{N_c-1} \left(\sum_{p=1}^{N_t} h_{f\_qp}(i)x_p(i)\right) x_1^*(i)\exp\left(j2\pi \frac{in}{N_c}\right)$$
$$= C_3 \sum_{p=1}^{N_t} h_{t\_qp}(n - s_p),$$

wherein $h_{t\_qp}(n)$ is a time-domain representation of a communication channel between a transmitter p and a receiver q, and $s_p$ represents a cyclic shift in samples applied to a training symbol of a p-th transmit antenna or spatial stream, and wherein $C_3$ is a normalization constant.

10. The method of claim 9, wherein the cyclic window integration is defined by $$a(n) = \sum_{k=0}^{N_w-1} |r'_q((n+k) \bmod N_c)|^2 w(N_w - 1 - k)$$

wherein mod is a modulo operator, and wherein w(n) represents a window of $N_w$ samples long.

11. A receiver configured to:
receive samples of training symbols that are cyclically shifted with respect to one another before being transmitted from a plurality of transmit antennas;
perform Fourier transform operations on the received samples of the training symbols to generate frequency-domain values associated with the received samples;
multiply the associated frequency-domain values of the received samples with a frequency-domain representation of the training symbols on each sub-carrier of a reference transmit antenna to generate multiplied values;
compute a channel impulse response by performing a least squares operation on the multiplied values; and
detect a number of shifts of the channel impulse response representative of a number of the transmit antennas.

12. A receiver configured to:
receive samples of training symbols that are cyclically shifted with respect to one another before being transmitted from a plurality of transmit antennas;
perform Fourier transform operations on the received samples of the training symbols to generate frequency-domain values associated with the received samples;
multiply the associated frequency-domain values of the received samples with a frequency-domain representation of the training symbols on each sub-carrier of a reference transmit antenna to generate multiplied values;
compute a channel impulse response, wherein computing the channel impulse response includes performing an inverse Fourier transform operation on the multiplied values; and
detect a number of shifts of the channel impulse response representative of a number of the transmit antennas.

13. A receiver configured to:
receive samples of training symbols that are cyclically shifted with respect to one another before being transmitted from a plurality of transmit antennas;
perform Fourier transform operations on the received samples of the training symbols to generate frequency-domain values associated with the received samples;
multiply the associated frequency-domain values of the received samples with a frequency-domain representation of the training symbols on each sub-carrier of a reference transmit antenna to generate multiplied values; and
compute a channel impulse response to detect a number of shifts of the channel impulse response representative of a number of the transmit antennas;
wherein the receiver is further configured to apply cyclic window integration on the channel impulse response and to detect a presence or absence of a peak value in each cyclic window to detect the number of shifted impulse responses in the channel impulse response.

14. The receiver of claim 13, wherein the receiver is further configured to establish one or more threshold values to define one or more matching rules to detect the presence or absence of a peak value.

15. The receiver of claim 14, wherein the one or more threshold values and the one or more matching rules are variables.

16. The receiver of claim 13, wherein a frequency-domain value on a receive antenna q and a subcarrier i is defined by:

$$y_q(i) = C_1 \sum_{n=0}^{N_c-1} r_q(n) \exp\left(-j2\pi \frac{in}{N_c}\right)$$

wherein $r_q(n)$ represents an n-th received time-domain sample on a q-th receive antenna, wherein a Fourier transform window of the training symbols includes $N_c$ samples, and a first sample of the Fourier transform window corresponds to n=0, wherein $C_1$ is a normalization constant, and wherein to compute the channel impulse response, the receiver is further configured to perform a least square operation on the multiplied values.

17. The receiver of claim 16, wherein each multiplied value is defined by:

$$y'_q(i) = y_q(i) x_1^*(i)$$

wherein $x_1(i)$ represents a frequency-domain representation on a subcarrier i of a training symbol without cyclic shift, and wherein $x^*_1(i)$ is a complex conjugate of $x_1(i)$.

18. The receiver of claim 17, wherein a time-domain representation of the channel impulse response is further defined by:

$$r'_q(n) = C_2 \sum_{i=0}^{N_c-1} y'_q(i) \exp\left(j2\pi \frac{in}{N_c}\right)$$

where $C_2$ is a normalization constant.

19. The receiver of claim 18, wherein the time-domain representation of the channel impulse response is further defined by:

$$r'_q(n) = C_2 \sum_{i=0}^{N_c-1} y'_q(i) \exp\left(j2\pi \frac{in}{N_c}\right)$$
$$= C_2 \sum_{i=0}^{N_c-1} \left(\sum_{p=1}^{N_t} h_{f\_qp}(i) x_p(i)\right) x_1^*(i) \exp\left(j2\pi \frac{in}{N_c}\right)$$
$$= C_3 \sum_{p=1}^{N_t} h_{t\_qp}(n - s_p)$$

wherein $h_{t\_qp}(n)$ is a time-domain representation of the communication channel between a transmitter p and a receiver q, and $s_p$ represents a cyclic shift in samples applied to training symbol of a p-th transmit antenna or spatial stream, and wherein $C_3$ is a normalization constant.

20. The receiver of claim 19, wherein a cyclic window integration is further defined by:

$$a(n) = \sum_{k=0}^{N_w-1} |r'_q((n+k) \bmod N_c)|^2 w(N_w - 1 - k)$$

wherein mod is a modulo operator, and
wherein w(n) represents a window of $N_w$ samples long.

21. A receiver, comprising:
means for receiving samples of training symbols that are cyclically shifted with respect to one another before being transmitted from a plurality of transmit antennas;
means for performing Fourier transform operations on the received samples of the training symbols to generate frequency-domain values associated with the received samples;
means for multiplying the associated frequency-domain values of the received samples with a frequency-domain representation of the training symbols on each sub-carrier of a reference transmit antenna to generate multiplied values;
means for computing a channel impulse response by performing a least squares operation on the multiplied values; and
means for detecting a number of shifts of the channel impulse response representative of a number of the transmit antennas.

22. A receiver, comprising:
means for receiving samples of training symbols that are cyclically shifted with respect to one another before being transmitted from a plurality of transmit antennas;
means for performing Fourier transform operations on the received samples of the training symbols to generate frequency-domain values associated with the received samples;
means for multiplying the associated frequency-domain values of the received samples with a frequency-domain representation of the training symbols on each sub-carrier of a reference transmit antenna to generate multiplied values;
means for computing a channel impulse response, wherein computing the channel impulse response includes performing an inverse Fourier transform operation on the multiplied values; and
means for detecting a number of shifts of the channel impulse response representative of a number of the transmit antennas.

23. A receiver, comprising:
means for receiving samples of training symbols that are cyclically shifted with respect to one another and transmitted from a plurality of transmit antennas;
means for performing Fourier transform operations on the received samples of the training symbols to generate frequency-domain values associated with the received samples;
means for multiplying the associated frequency-domain values of the received samples with known frequency-domain representations of the training symbols on each sub-carrier of a reference transmit antenna to generate multiplied values;
means for computing a channel impulse response;
means for detecting a number of shifted impulse responses in the transmission channel impulse response, wherein the detected number of shifted impulse responses represents a number of the transmit antennas;
means for applying cyclic window integration on the channel impulse response; and
means for detecting a presence or absence of a peak value in each cyclic window associated with the integration to detect the number of shifted impulse responses in the channel impulse response.

* * * * *